(12) United States Patent
Kapner, III et al.

(10) Patent No.: US 7,596,797 B1
(45) Date of Patent: Sep. 29, 2009

(54) CLIENT TERMINAL FOR PROVIDING A SUBSCRIPTION TO A BUNDLE OF CHANNELS FROM A PROGRAM GUIDE

(75) Inventors: L. Jeffrey Kapner, III, Yorba Linda, CA (US); George B. Hefner, Las Flores, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 939 days.

(21) Appl. No.: 09/920,583

(22) Filed: Jul. 31, 2001

(51) Int. Cl.
*H04N 5/445* (2006.01)
(52) U.S. Cl. .............................. 725/46; 725/44; 725/45; 725/50; 725/51; 725/61
(58) Field of Classification Search ............. 725/44–46, 725/50–51, 61
See application file for complete search history.

(56) References Cited

U.S. PATENT DOCUMENTS

| | | | |
|---|---|---|---|
| 5,589,892 A * | 12/1996 | Knee et al. .................... 725/43 |
| 5,822,123 A * | 10/1998 | Davis et al. .................... 725/43 |
| 6,016,141 A * | 1/2000 | Knudson et al. ............. 715/721 |
| 6,314,572 B1 * | 11/2001 | LaRocca et al. ................ 725/60 |
| 6,637,029 B1 * | 10/2003 | Maissel et al. ................. 725/46 |
| 6,664,984 B2 | 12/2003 | Schlarb et al. |
| 2003/0009757 A1 * | 1/2003 | Kikinis ......................... 725/39 |
| 2003/0023980 A1 * | 1/2003 | Kikinis et al. ............... 725/100 |
| 2004/0078823 A1 | 4/2004 | Schlarb et al. |

* cited by examiner

*Primary Examiner*—John W Miller
*Assistant Examiner*—Sumaiya A Chowdhury
(74) *Attorney, Agent, or Firm*—Blakely, Sokoloff, Taylor & Zafman (57) ABSTRACT

A client terminal connectable to a video distribution system (VDS) and a display device. The VDS provides program guide information to create a program guide that includes program guide entries for subscribed channels and non-subscribed channels which is displayed on the display device. The client terminal includes a terminal controller responsive to a subscription control program that selects a program guide entry in response to user input. If the selected program guide entry is for a non-subscribed channel, the terminal controller responsive to the subscription control program selects a bundle of channels based upon a subscription matrix for the user, the selected program guide entry, and the available bundles of channels for subscription, and transmits the subscription request for the selected bundle of channels to the VDS.

29 Claims, 5 Drawing Sheets

BUNDLING EXAMPLE

| | 1 | 2 | 3 |
|---|---|---|---|
| HBO A la Carte $15/Mnth | 1 | 2 | 3 |
| SHO A la Carte $15/Mnth | 1 | | 3 |
| ENC A la Carte $15/Mnth | | 2 | 3 |
| STARZ A la Carte $15/Mnth | | 2 | 3 |

| | Additional Subscription Programs | ISP Service | Action, Sports, Drama, etc. Tiers | Other Services |
|---|---|---|---|---|
| Bundle 1 = $25/Mnth | + $7 each/Mnth | + $35 each/Mnth | + $15 each/Mnth | ... |
| Bundle 2 = $30/Mnth | + $5 each/Mnth | + $25 each/Mnth | + $10 each/Mnth | ... |
| Bundle 3 = $32/Mnth | + $3 each/Mnth | + $15 each/Mnth | + $5 each/Mnth | ... |

CLIENT TERMINAL FOR PROVIDING A SUBSCRIPTION TO A BUNDLE OF CHANNELS FROM A PROGRAM GUIDE

BACKGROUND OF THE INVENTION

1. Field of the Invention

The present invention relates to the field of communications. More particularly, the present invention relates to a client terminal that provides for a subscription to a bundle of channels from a program guide.

2. Description of the Prior Art

Video program providers, such as cable and satellite networks, offer tiered levels of service from which a user can subscribe. These tiered levels of service include many different channels. Typically there are basic tiers, expanded basic tiers, and premium tiers. The basic tier level of service usually includes "must carry" and retransmission channels known as broadcast network channels, e.g., ABC, NBC, CBS, etc. The expanded basic tier includes the basic tier channels and an aggregation of satellite channels, e.g., USA, FOX, TNT, MTV, VH1, etc. Video program providers typically charge a fixed subscription fee for subscription to the basic tier or to the expanded basic tier or other tiered clusters of channels.

Video program providers also offer a variety of premium tiers that, in addition to the basic tier or the expanded basic tier, include "premium channels," such as HOME BOX OFFICE (HBO), SHOWTIME (SHO), CINEMAX (CMAX), STARZ, ENCORE (ENC) etc. Premium channels typically offer video programming that is not available from the basic tier channels and the expanded basic tier channels, such as newly released movies. Video program providers usually charge an extra subscription fee for each premium channel subscribed to, above and beyond the subscription fee for the basic tier or the expanded basic tier. Also, for subscribers who wish to subscribe to more than one premium channel, video program providers often provide "bundles" of premium channels (e.g. HBO and SHO combined), which have a discounted subscription fee for the bundle of premium channels—as opposed to what the additive subscription fee would be if each of the premium channels were subscribed to individually.

Typically, the channels that the user has subscribed to (i.e. subscribed channels) are shown in an on-screen program guide to the user on the user's display device (e.g. a television set). On-screen program guides usually display a listing of channels, typically in numerical order (based on the channel position and the channel call sign of the video transmission system), and the titles of the programs being broadcasted or to be broadcasted on the channels. These on-screen program guides typically show the user the list of channels and corresponding programs in a fixed grid format that scrolls (automatically or manually via user input) in a vertical direction across the screen for a fixed interval of time—displayed in a horizontal direction across the screen. The user of the program guide may then select the channel by entering in the channel number or selecting a program. The system responds by removing the program guide being displayed and tuning to the station selected and displaying the program.

Unfortunately, the channels that the user has not subscribed to (i.e. non-subscribed channels) are oftentimes not shown in the program guide. This represents a loss of advertising of the non-subscribed channel to the user. Furthermore, to subscribe to a non-subscribed channel, a user must undergo the laborious process of calling the video program provider to subscribe to the channel, which is inconvenient and time consuming. Moreover, even if a user can get through to the video program provider to subscribe to a non-subscribed channel (e.g. a premium channel), the user may be charged solely for the premium channel and may not be provided with or offered a subscription to a more cost effective bundle of premium channels, other bundles of channels providing a greater array of premium channels, or to special promotions offered by the video program provider.

There is, therefore, the need to provide techniques to provide a user with a subscription to an appropriate bundle of channels.

SUMMARY OF THE INVENTION

The present invention may be regarded as a client terminal connectable to a video distribution system and a display device. The video distribution system provides program guide information to create a program guide that includes program guide entries for subscribed channels and non-subscribed channels.

The client terminal includes a video distribution system interface to receive the program guide information, a display interface to display the program guide on the display device, a user interface to receive user input, and a terminal controller responsive to a subscription control program. The terminal controller responsive to the subscription control program selects a program guide entry from the program guide in response to user input. If the selected program guide entry is for a non-subscribed channel, the terminal controller responsive to the subscription control program selects a bundle of channels based upon a subscription matrix for the user, the selected program guide entry, and the available bundles of channels for subscription, and transmits the subscription request for the selected bundle of channels to the video distribution system. In one embodiment, the selected bundle of channels is the most cost effective bundle of channels that has a subscription cost that is less than the subscription cost of individually subscribing to the non-subscribed channel.

The present invention may also be regarded as a computer program embodied in a computer readable storage medium for use in the client terminal. The computer program includes code segments for, in response to user input, selecting a program guide entry, and if the selected program guide entry is for a non-subscribed channel, selecting a bundle of channels. The selection of the bundle of channels is based upon a subscription matrix for the user, the selected program guide entry, and the available bundles of channels for subscription. The computer program further includes code segments for transmitting a subscription request for the selected bundle of channels to the video distribution system.

The present invention may further be regarded as a method for selecting a bundle of channels utilizing a program guide. In response to user input, a program guide entry is selected. If the selected program guide entry is for a non-subscribed channel, a bundle of channels is selected. The bundle of channels is selected based upon a subscription matrix for the user, the selected program guide entry, and the available bundles of channels for subscription. Further, a subscription request is transmitted for the selected bundle of channels to the video distribution system.

In some embodiments, the video distribution system after receipt of the subscription request verifies a user's credit with a billing system to determine whether the user's credit is approved or disapproved for the selected bundle of channels. The terminal controller of the client terminal responsive to the subscription control program receives the approval or disapproval from the video distribution system, and if the user's credit is approved, the terminal controller updates a subscription matrix to reflect that the client terminal is now subscribed to the selected bundle of channels and authorizes access to the selected bundle of channels.

DESCRIPTION OF THE PREFERRED EMBODIMENTS

Figure 1:
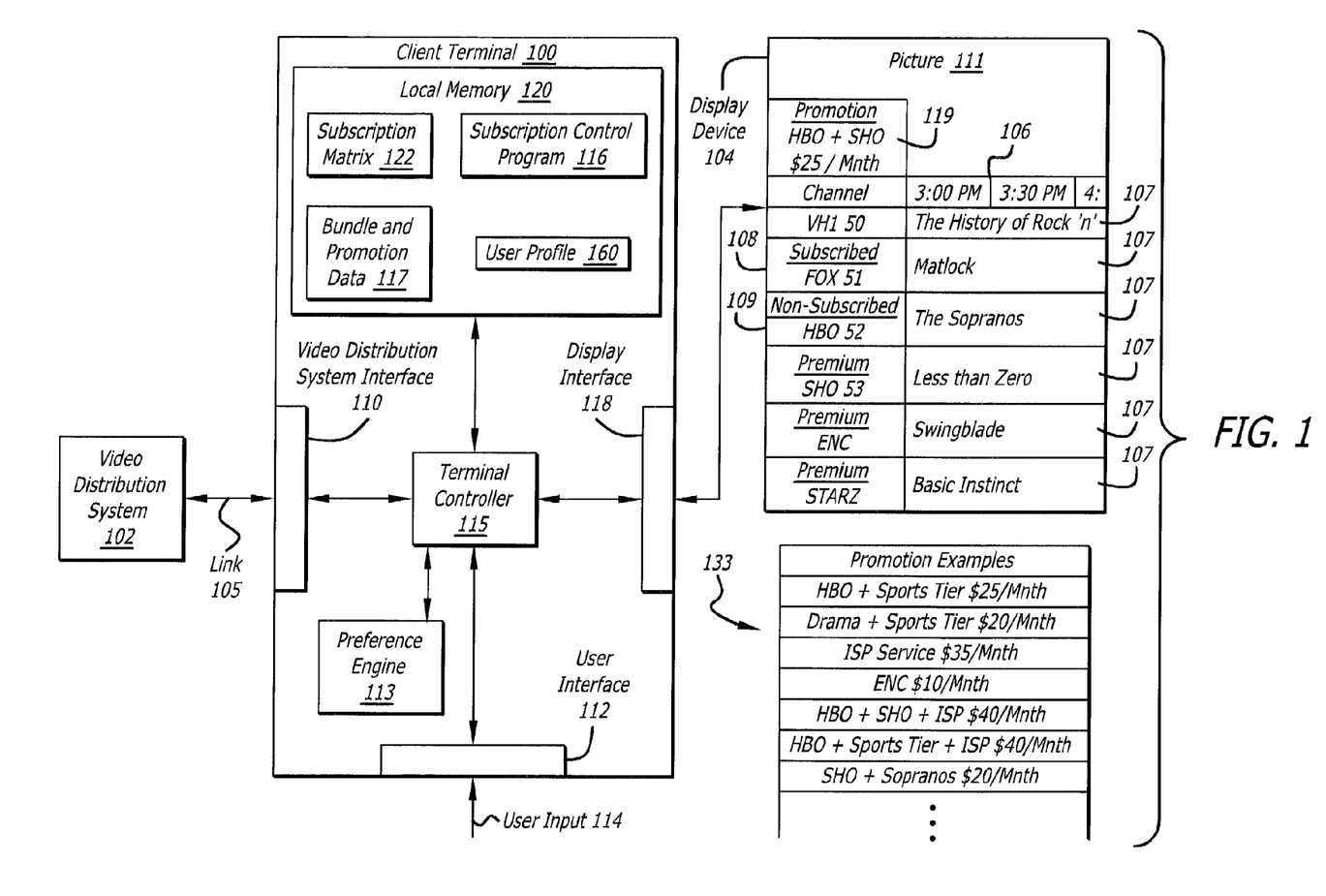
FIG. 1 shows a client terminal, connected to a video distribution system and a display device, that provides for a subscription to a bundle of channels from a program guide according to an embodiment of the present invention.

FIG. 1 shows a client terminal 100, connected to a video distribution system 102 and a 3 display device 104, that provides for a subscription to a bundle of channels from a program guide 106. The video distribution system 102 provides program guide information to the client terminal 100 through a link 105, as well as video programs. The program guide information is used by the client terminal 100 to create a program guide 106. The program guide 106 includes program guide entries 107 for subscribed channels 108 and non-subscribed channels 109 which are displayed on the display device 104. Also, a promotion display 119 that advertises bundles of channels can also be displayed on the display device 104.

The client terminal 100 includes a video distribution system interface 110 to receive the program guide information, a display interface 118 to display the program guide 106 on the display device 104, a user interface 112 to receive user input 114, and a terminal controller 115 responsive to a subscription control program 116. The terminal controller 115 responsive to the subscription control program 116 selects a program guide entry 107 in response to user input 114 designating a program guide entry 107 from the program guide 106 for a channel that the user wishes to view. If the selected program guide entry 107 is for a non-subscribed channel 109, the terminal controller 115 responsive to the subscription control program 116 selects a bundle of channels based upon a subscription matrix 122 for the user, the selected program guide entry 107, and the available bundles of channels for subscription (e.g. determined from the bundle and promotion data 117), and transmits the subscription request for the selected bundle of channels to the video distribution system 102.

In one embodiment, the selected bundle of channels is the most cost effective bundle of channels that has a subscription cost that is less than the subscription cost of individually subscribing to the non-subscribed channel(s). Video distribution systems 102 often provide "bundles" of subscription or premium channels (e.g. HBO and SHO combined), which have a discounted subscription cost for the bundle of premium channels—as opposed to what the additive subscription cost would be if each of the premium channels were each subscribed to individually. Thus, for a user who is already subscribed to a subscription channel, the user can be automatically provided with a subscription to a discounted bundle of channels (e.g. the most cost effective bundle of channels that includes the selected non-subscribed channel in addition to the one or more previously subscribed to channels by the user).

The video distribution system 102 can be a cable head-end, a satellite head-end, a terrestrial broadcast head-end, a multiple-service operator (MSO), a computer server head-end, or any combination thereof, that is capable of broadcasting the program guide information and video programs. The display device 104 is typically a television, computer monitor, or any other sort of display device.

The program guide information can be transmitted from the video distribution system 102 to the client terminal 100 across link 105 in any type of data format designed to transfer data such as concatenated data, packetized data, associated database sets of attributes, etc. As shown in FIG. 1, the program guide 106 created by the client terminal 100 for display on the display device 104 can be a program guide that includes a listing of channels in numerical order (based on the channel position and the channel call sign of the video transmission system) and the titles of the programs being broadcasted or to be broadcasted on the channels. The program guide 106 can show the user the list of channels and corresponding programs in a fixed grid format that scrolls (automatically or manually via user input) in a vertical direction across the screen of the display device 104 for a fixed interval of time—displayed in a horizontal direction across the screen. Also, a video picture 111 can be shown in conjunction with the program guide 106. It should be appreciated that program guides are known in the art and embodiments of the invention can be utilized with a variety of different program guides.

As shown in the exemplary program guide 106, which serves merely as an illustration of a program guide, the following channels are shown: channel 50-VH1, channel 51-FOX, channel 52-HBO, channel 53-SHO, etc. The corresponding titles of the video programs and the times are also shown. It should be appreciated that any type of program guide format can be utilized with embodiments of the invention. In this example, channel 51-FOX an expanded basic channel, is shown as a subscribed channel 108, and channel 52-HBO, a premium channel, is shown as a non-subscribed channel 109. Moreover, it should be appreciated that, in a digital environment, other digital channels could be shown such as HBO-2, HBO-3, SHO-2, SHO-3, etc. Additionally, the channels shown can also be computer network channels (e.g. Internet channels). Also, a promotion display 119 that advertises bundles of channels can also be displayed on the display device 104.

The video programs can be transmitted from the video distribution system 102 to the client terminal 100 across link 105 in a digital format (e.g. Moving Pictures Experts Group (MPEG)-2 format, Advanced Television System Committee (ATSC) format, Digital Video Broadcast (DVB) format, Open Cable Standards, etc.) or analog format (e.g. National Television Standard Committee (NTSC), Phase Alternation Line (PAL), etc.) across the link 105 to the client terminal 100. The video programs typically include audio and video (A/V) information (e.g. a movie, television program, etc.) but can also include other types of information such as data. For example, the data of a digitally broadcasted video program may include graphics, video, web pages, multimedia, text, and other types of data in a variety of differing data formats (e.g. Internet Protocol (IP), Advanced Television Enhancement Forum (ATVEF) content, Open Cable Standards, etc.). In the digital environment, a digital channel (e.g. HBO) can include a tier of channels (e.g. HBO-1, HBO-2, HBO-3). Moreover, in the digital environment, the channels shown in the program guide 106 can also be computer network channels (e.g. Internet channels) that upon user selection connect the client terminal to a computer network (e.g. the Internet) and to the selected computer network channel. In this embodiment, the client terminal 100 has the appropriate hardware (network interface cards, internal/external modems, etc.) and can be connected to a computer network (e.g. the Internet) with a standard telephone modem (using the plain old telephone system (POTS)), a Digital Subscriber Line (DSL) modem (using a Digital Subscriber Line), a cable modem (using a cable network), etc.

It should be appreciated that the program guide 106 and the promotion display 119 can display channels (i.e. video programming services, premium channels, basic channels, expanded basic channels, music services, computer network channels, Internet services, Internet channels, Internet access, data services, etc.) that are aggregated from a plurality of different sources (e.g. cable providers, satellite providers, terrestrial broadcast providers, multiple-service operators (MSOs), computer network service providers, Internet Service Providers (ISPs), etc.) such that a user can automatically subscribe to a bundle of channels (as will be discussed in detail later) from any one of these type of providers which allows for partnering among these various providers.

The link 105 can be broadly defined as a communication network formed by one or more transport mediums. The link 105 can include a variety of communication networks such as cable networks, terrestrial broadcast networks, satellite networks, computer networks (e.g. the Internet, wide area networks (WANs), local area networks (LANs), wireless networks, etc.), or generally any sort of public or private communications network, and combinations thereof. Examples of a transport medium include, but are not restricted to electrical wire, optical fiber, cable, or wireless channels using terrestrial, satellite, radio frequency, or any other wireless signaling methodology. In one embodiment, the client terminal 100 is coupled to the video distribution system 102 by a link that provides a persistent connection (e.g. a cable link).

The client terminal 100 of FIG. 1 preferably includes a video distribution system interface 110, a user interface 112, a display interface 118, a local memory 120, and a terminal controller 115. The video distribution system interface 110 receives the program guide information and the video programs from the video distribution system 102 and transmits them to the terminal controller 115 for processing. The user interface 112 is used to receive user input 114 and transmits the user input to the terminal controller 115 for processing. As will be discussed in more detail later, user input 114 is utilized for selection of a program guide entry 107 from the program guide 106 for a non-subscribed channel 109 and further to indicate that the user would like to subscribe to a bundle of channels. The user input 110 can also cause the client terminal 100 to perform other functionality associated with client terminals (e.g. changing channels, digitally recording video programs, etc.).

The user input 114 can be from a remote control (e.g. infrared or optical), keyboard, touch screen, voice activation, mouse, telephone, cellular telephone, computer (personal, laptop, network, etc.) that is locally or remotely connected to the client terminal 100, a personal digital assistant (PDA) that is locally or remotely connected to the client terminal 100, or basically any sort of input device that is locally or remotely connected to the client terminal 100 to transmit the selections of the user to the client terminal 100. The user interface 112 may include appropriate hardware and associated software to receive the transmission of user input 114 from a local or remote user input device. For example, the user interface 112 may include: infrared (I/R) receivers, optical receivers, appropriate Input/Output (I/O) cards, network interface cards, internal/external modems (standard telephone modem, Digital Subscriber Line (DSL) modem, cable modem, etc.), plain old telephone system (POTS) receivers, cellular telephone receivers, wireless receivers, etc.; such that the client terminal 100 can be connected locally to a user input device, or, remotely to a user input device through a computer network (e.g. the Internet), the POTS, a cellular network, or a wireless network, etc. It should be appreciated by those skilled in the art that any sort of user input device through any type of connection and network can be used to transmit the selections of the user to the client terminal 100 and the above examples are only illustrative.

Thus, the client terminal 100 is capable of being locally or remotely accessed to cause the client terminal 100 to perform basic functionality associated with client terminals such as scheduling video programs to be digitally recorded at a certain time, as well as, aspects associated with the embodiments of the present invention for subscribing to a channel and further subscribing to a particular bundle of channels. Also, conflict resolution can be performed locally or remotely by a user. The client terminal 100 can notify a local or remote user of a conflict and perform conflict resolution to allow the user to resolve the conflict. For example, conflicts can occur when the user commands the client terminal 100 via user input 114 to digitally record a program at the same time another program has been previously programmed to be recorded, when the user commands the client terminal 100 via user input 114 to subscribe to a channel that the user already has a subscription to, etc.

In some embodiments, the client terminal 100 includes a preference engine 113 coupled to the terminal controller 115. The preference engine 113 is configured to track user selection of video program content (i.e. the channels selected and the types of content on the channels selected) and to create a user profile representing the user's viewing preferences. For instance, the viewing preferences, and thus the display of channels, may be categorized based on broadcast content and the associated programming attributes associated with the program or series, such as the genre of sports, entertainment, news, and movies, as well as, associated attributes assigned by the program guide. Moreover, the viewing preferences and the display of channels may be based on additional sources for viewing preferences such as preferred TV channels including one or more non-subscribed channels, one or more pay-per-view channels, one or more video-on-demand channels, or a combination thereof. In addition, the viewing preferences may include other categories such as advertising, infomercials, catalogs, Internet content, which is accessible, for example, via a modem. The preference engine 113 can then select program guide entries 107 for subscribed channels 108 and non-subscribed channels 109 for display in the program guide 106 based upon a user's viewing patterns (i.e. a user's profile). Moreover, the preference engine 113 can select promotion displays 119 for a bundle of channels for display on the display device 104 based upon a user's viewing patterns to thereby provide targeted promotions to the user.

More particularly, in one embodiment, the preference engine 113 is a software module that learns a user's viewing preferences by monitoring the user's viewing patterns or by specific explicit direction of the user. The preference engine 113 uses the viewing patterns of the user to create a user profile 160 that may be stored in local memory 120. It is contemplated that the preference engine 113 may create user profiles for more than one user and store the multiple user profiles in local memory 120. Thus, the user-specific user profile 160 represents the contents and channels the user prefers and on which day and at what time of day the user watches a specific content. Therefore, the preference engine 113 can narrow down the multitude of available programs for display in the program guide 106 down to a reasonable number of program choices, based upon the user's actual viewing pattern, and select program guide entries 107 for programs, on both subscribed channels 108 and non-subscribed channels 109, for display in the program guide 106. The client terminal 100 may continually update the user's profile 160 depending upon the user's actual viewing preferences and based upon other events, for example, depending on whether or not it is the season for a certain sports event. The client terminal 100, therefore, enables the program guide 106 to have a "learning" capability for adjusting to each user's viewing preferences.

Accordingly, the user can be presented with subscribed channels 108 and non-subscribed channels 109 that the user is likely to select for viewing, and in the case of non-subscribed channels 109, for automatic subscription and bundling with other channels. Moreover, as will be discussed, the user can be presented with channels within a recommended bundle that the user will likely subscribe to. In this way, a user is presented with targeted non-subscribed channels 109 that increase the likelihood of an impulse automatic subscription and, when an impulse automatic subscription occurs, increases revenues to the video distribution system 102 accordingly. Furthermore, the user can be presented with targeted promotion displays 119 for bundles of channels that user is likely to select for viewing and automatic subscription.

The display interface 118 displays the program guide 106, including the program guide entries 107 for subscribed channels 108 and non-subscribed channels 109, on the display device 104. Also, the display interface 118 displays video programs transmitted from the video distribution system 102 on the display device 104. Typically, the program guide 106 is generated by the terminal controller 115 based upon the program guide information received from the video distribution system 102 and is then displayed via the display interface 118 on the display device 104. Alternatively, the video distribution system 102 can generate the program guide 106 and transmit the program guide 106 to the client terminal 100 such that the program guide is then displayed via the display interface 118 on the display device 104.

In one embodiment, if the user does not have an existing subscription to the channel (i.e. it is a non-subscribed channel (e.g. non-subscribed channel 109)), the program guide entry 107 for the channel is marked as not having an existing subscription, such as by low-lighting. On the other hand, if the user has an existing subscription to the channel (i.e. it is a subscribed channel (e.g. subscribed channel 108)), the program guide entry for the channel is marked as not having an existing subscription, such as by highlighting. It should be appreciated that many different schemes can be used for differentiating between subscribed and non-subscribed channels. For example, non-subscribed channels can be gray lighted or shadowed whereas subscribed channels can appear normal or colored.

The local memory 120 is coupled to the terminal controller 115. In one embodiment, the local memory 120 is used to preferably store a subscription control program 116, bundle and promotion data 117, a subscription matrix 122, and a user profile 160 (as previously discussed). Alternatively, the subscription control program 116 and/or the subscription matrix 122 can instead be located or co-located at the video distribution system 102 or another remote location, such as a back office. Also, the local memory 120 can be used to store the program guide information, the program guide, video programs, and other types of information. In one embodiment, the local memory 120 includes a rotating storage disk (e.g. magnetic, optical, etc.). Alternatively, the local memory 120 can include any type of semiconductor memory.

The bundle and promotion data 117 preferably includes the currently available bundles of channels (e.g. premium channels), and their associated prices, as well as other promotional information available from the video distribution system 102 for display as a promotion display 119 on the display device 104, as will be discussed. The bundle and promotion data can instead be located, or co-located, at the video distribution 102 or at other remote locations, such as a back office.

Figure 2:
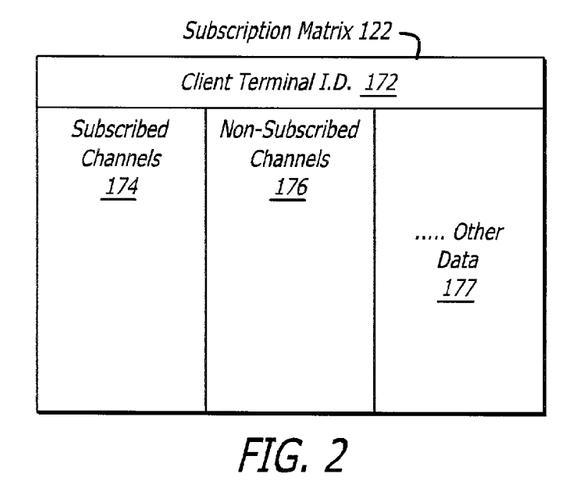
FIG. 2 shows a subscription matrix according to the embodiment of the invention shown in FIG. 1.

Turning briefly to FIG. 2, FIG. 2 shows a subscription matrix 122 according to the embodiment of the invention shown in FIG. 1. The subscription matrix 122 preferably includes client terminal ID data 172 that identifies the particular client terminal to which the subscription matrix 122 is associated. Furthermore, the subscription matrix 122 includes data 174 that identifies which channels the associated client terminal is subscribed to (i.e. subscribed channels) and data 176 that identifies which channels that are available for subscription that the associated client terminal is not subscribed to (i.e. non-subscribed channels). The subscription matrix 122 also includes bundle data 175 identifying the bundle(s) of channels (e.g. premium channels) that the user is currently subscribed to. The subscription matrix 122 can also include other data 177, such as, a pay per view purchase list, a video on demand purchase list, etc. As previously discussed, the subscription matrix 122 can be located in local memory 120, located at the video distribution system 102 or another remote location, or co-located in local memory 120 and at the video distribution system 102 or another remote location such as a back office.

Returning again to FIG. 1, the terminal controller 115 is responsive to the subscription control program 116 to perform many of the functions of the client terminal 100, as will be discussed. As should be appreciated by those skilled in the art, the terminal controller 115 preferably includes a suitable processor and associated memory. Furthermore, the terminal controller 115 may include encoding and decoding functionality (hardware and/or software) to encode analog signals (e.g. NTSC signals) into digital signals (e.g. MPEG-2) and to decode digital signals (e.g. MPEG-2) into analog signals (e.g. NTSC signals). This allows digital signals to be decoded for display on an analog display device and allows analog signals to be encoded into digital signals for recording in local memory along with other functionality associated with client terminals/set top boxes. Moreover, it should be appreciated that client terminals with recording capabilities and other types of set top boxes are well known in the art.

In one embodiment, the subscription control program 116 is suitably implemented by the terminal controller 115 of the client terminal 100 as one or more instructions or code segments. The instructions/code segments when read and executed by the terminal controller 115 cause the terminal controller 115 to perform the operations necessary to implement the various functions according to embodiments of the invention. Generally, the instructions/code segments are tangibly embodied in and/or readable from a machine-readable medium, device, or carrier, such as memory, data storage devices, and/or a remote device contained within or coupled to the client terminal 100. The instructions/code segments may be loaded from memory (e.g. local memory 120), data storage devices, and/or remote devices into the terminal controller 115 for use during operations.

The terminal controller 115 causes the display interface 118 to display the program guide 106 upon the display device 104. A user, via user input 114, can pick a program guide entry 107 by designating either the channel or the title of the program for viewing. As an example, the user may pick a non-subscribed channel (e.g. premium channel 52 HBO) 109. A non-subscribed channel can also include a non-subscribed tier of channels (e.g. in the digital environment selection of the premium channel 52 HBO may include HBO-2 and HBO-3 etc.) In response to the user input 114, the terminal controller 115 responsive to the subscription control program 116 selects the program guide entry 107 for the selected channel. The terminal controller 115 responsive to the subscription control program 116 then determines whether the user has an existing subscription to the selected channel (i.e. whether it is a subscribed channel) by examining the subscription matrix 122 (e.g. by checking the subscribed channels data 174). Also, the data 176 for channels not subscribed to (i.e. non-subscribed channels) of the subscription matrix 122 is checked to determine whether the channel is available and not yet subscribed to. If the user has an existing subscription, then the selected channel is displayed.

However, if the user does not have an existing subscription (i.e. it is a non-subscribed channel) and it is available for selection, the terminal controller 115 responsive to the subscription control program 116 selects at least one bundle of channels based upon the subscription matrix 122 for the user, the selected program guide entry, and the available bundles of channels, for subscription by the user. The available bundles of channels for subscription can be determined by examining the bundle and promotion data 117. Based upon this, the terminal controller 115 responsive to the subscription control program 116 recommends at least one bundle of channels to the user for subscription. For example, the terminal controller 115 can recommend the most cost effective bundle of channels, as well as, other bundles of channels providing a greater array of premium channels. As previously discussed, video distribution systems often provide "bundles" of subscription or premium channels (e.g. HBO and SHO combined), which have a discounted subscription cost for the bundle of premium channels—as opposed to what the additive subscription cost would be if each of the premium channels were each subscribed to individually. Thus, for a user who is already subscribed to a subscription channel, the user can be recommended a subscription for a more cost effective bundle of channels (e.g. the most cost effective bundle of channels that includes the selected non-subscribed channel in addition to the one or more previously subscribed to channels by the user). Alternatively, as previously discussed, the user can be automatically provided with a subscription to the most cost effective bundle of channels. Moreover, as will be discussed, the user can also be recommended other bundles of channels providing a greater array of channels. In one embodiment, the preference engine 113 can select one or more bundles of channels based upon a user's viewing profile 160 to be recommended to the user thereby presenting targeted bundles of channels to the user. It should be appreciated that in a digital environment, when a user subscribes to a service, such as a premium service, the user will sometimes be subscribed to a multiplex of channels. For example, when a user subscribes to HBO, the offering usually includes more than one HBO channel: HBO, HBO west, HBO family, etc. Thus, in a digital environment, the bundled premium services and promotions, can include multiplexed channels.

Figure 3:
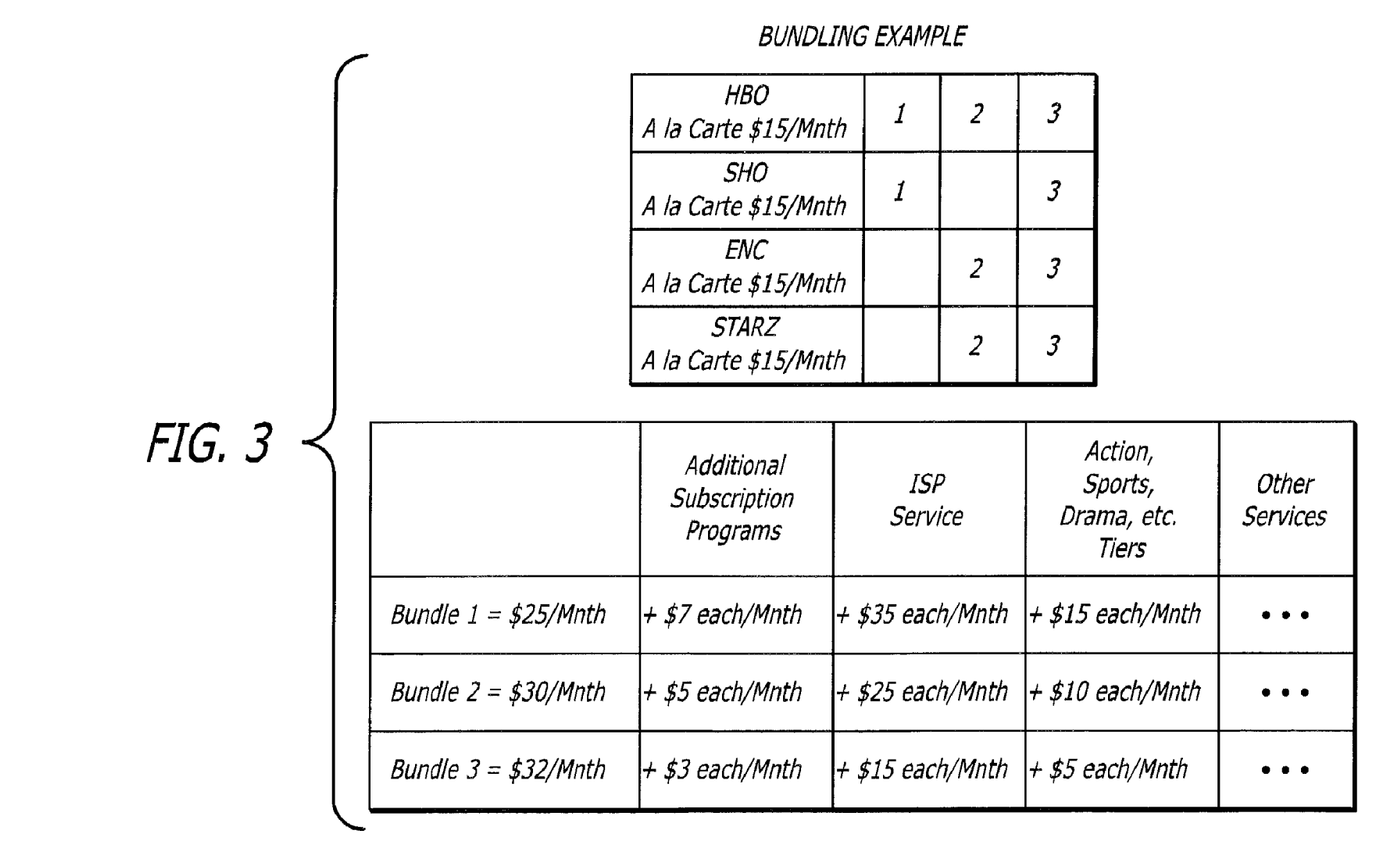
FIG. 3 provides an example of bundles of channels.

Referring also to FIG. 3, FIG. 3 provides an example of bundles of channels that could be recommended to a user. For example, bundle 1 includes HBO and SHO for a price of $25.00 per month, bundle 2 includes HBO, ENC, and STARZ for a price of $30.00 per month, and bundle 3 includes HBO, SHO, ENC, and STARZ for a price of $32.00 per month. Individually, often termed A la Carte, each of these premium channels can cost approximately $15.00 per month for an individual subscription.

As an example, if a user is already subscribed to HBO at $15.00 per month, and selected the premium channel SHO for subscription, the subscription fee for these premium channels individually would be $30.00 a month. Advantageously, the terminal controller 115 responsive to the subscription control program 116 recommends the most cost effective bundle of channels, bundle 1, which includes HBO and SHO for a more cost-effective subscription cost of $25.00 a month. As another example, if a user is already subscribed to HBO at $15.00 per month, and selected ENC for subscription, the subscription fee for these premium channels individually would be $30.00 per month. However, the terminal controller 115 responsive to the subscription control program 116 would recommend bundle 2, which includes HBO, ENC, and STARZ for the same subscription fee of $30.00 per month. Lastly, as yet another example, if a user already has a subscription to HBO and ENC, and selected SHO for subscription, the subscription fee for these premium channels individually would be $45.00 per month. The terminal controller 115 responsive subscription control program 116 would recommend bundle 3, which includes HBO, SHO, ENC, and STARZ for a discounted subscription fee of $32.00 per month.

Furthermore, the terminal controller 115 responsive to subscription control program 116 can recommend bundles of channels that provide a greater array of premium channels. For example, if a user is already subscribed to HBO and wishes to subscribe to SHO, the terminal controller 115 may recommend not only the most cost effective bundle, bundle 1 at $25.00 per month, but also bundle 3 which not only includes HBO and SHO but also ENC and STARZ for $32.00 per month. This is only $7.00 per month more but includes two more premium channels. For example, this recommendation could be made by the preference engine 113 based upon a user's viewing profile 160 thereby presenting a targeted bundle of channels to the user. For instance, assuming STARZ is currently running a series of all the different Godfather movies, and the user's viewing profile 160 indicates that the user likes mob-based storylines, the preference engine 130 may recommend bundle 3. Accordingly, a user may very well pick this more expensive bundle providing increased profits to the video distribution system 102.

It should be appreciated that a variety of different bundling schemes could be utilized with embodiments of the invention for a variety different channels. Furthermore, it should be appreciated that not only premium channels can be bundled. For example, other types of bundling include the bundling of: additional subscriptions to individual programs (e.g. on a premium channel, HBO—the Sopranos), Internet access via an Internet Service Provider (ISP), tiers of channels (e.g. action, sports, drama, etc.), computer network channels, Internet channels, data channels (e.g. sports, news, etc.), Enhanced TV, Interactive TV, and a variety of other services provided by video distribution systems can also be bundled. This provides users with cost savings when they subscribe to a more cost effective bundle of channels and increased revenues to video distribution systems when users subscribe to additional bundles of channels and services (recommend to the user) that they may not otherwise subscribe to.

For example, continuing with reference FIG. 3, along with bundle 1 at $25.00/month, an additional subscription program could be bundled for an additional $7.00/month, ISP service could be bundled for an additional $35.00/month, a tier of channels (e.g. action, sports, drama, etc.) could bundled for an additional $15.00 each/month, along with other services. In addition to bundle 2 at $30.00/month, an additional subscription program could be bundled for an additional $5.00/month, ISP service could be bundled for an additional $25.00/month, a tier of channels (e.g. action, sports, drama, etc.) could bundled for an additional $10.00 each/month, along with other services. Continuing with the example, in addition to bundle 3 at $32.00/month, an additional subscription program could be bundled for an additional $3.00/month, ISP service could be bundled for an additional $15.00/month, a tier of channels (e.g. action, sports, drama, etc.) could bundled for an additional $5.00 each/month, along with other services. All of these additional bundled services can be recommended to the user, as will be discussed.

It should be appreciated that the above example is merely for illustrative for purposes. However, it shows how various channels and services can be successively bundled together providing cost-effective bargains to the user (i.e. decreasing relative costs for the more channels and services subscribed to) and increased revenues to video distribution systems when users subscribe to additional bundles of channels and services (recommend to the user) that they may not otherwise subscribe to. For example, all of these additional subscription programs, premium channels, Internet service, tiers of channels, etc., can be recommend to the user by the preference engine 113 based upon a user's viewing profile 160 (e.g. what types of story-lines they prefer in movies and programs, whether they currently have Internet access, what sort of content they enjoy (action, sports, drama, etc.)) to thereby present a targeted bundle of channels and services to the user. Moreover, by allowing users to subscribe to a bundle of different channels or services from different providers (e.g. HBO from a cable provider, an Action tier from a satellite provider, and ISP service from EARTHLINK) this allows for partnering among these various providers as well as increased customer satisfaction and lower customer churn (or attrition).

The recommended bundle(s) of channels (e.g. the most cost effective bundle as well as other bundles providing a greater array of channels and services), can be displayed to the user by a pop-up on the display device 104. The pop-up could display a numbered list of bundles selectable by the user. For example, continuing with the previous example where the user is already subscribed to HBO and selects the premium channel SHO for subscription, the pop-up could include a numbered list: "1. HBO+SHO $25/month, 2. HBO+SHO+ENC+STARZ $32.00/month, 3. Cancel." Although, it should be appreciated that many display schemes for providing a list of bundles are available and readily apparent to one skilled in the art and this is only one example. Thus, a user can be automatically offered the most cost effective bundle of channels, as well as other bundles, that provide a greater array of channels.

If the user responds with user input 114 indicating that they do not wish to subscribe (e.g. by selecting "3. Cancel"), then the terminal controller 115 responsive to the subscription control program 116 returns to standard processing (e.g. again simply displaying the program guide 106). However, if the user responds with user input 114 selecting one of the bundle of channels (e.g. by selecting "1. HBO+SHO $25/month" or "2. HBO+SHO+ENC+STARZ $32.00/month"), the terminal controller 115 responsive to the subscription control program 116 transmits a subscription request for the selected bundle of channels to the video distribution system 102.

In another embodiment of the invention, the video distribution system 102 provides promotion information to create a promotion display 119 that advertises a bundle of channels on the display device 104. Although the promotion display 119 is shown with the program guide 106 in FIG. 1, it should be appreciated that the promotion display 119 can be displayed without the program guide 106. As shown FIG. 1, the promotion display 119 shows the text for a bundle of channels: HBO and SHO $25.00/month. It should also be appreciated that any means of advertising a bundle of channels to a user can be utilized such as text, video, still pictures, icons, and combinations thereof, etc. can be used to advertise non-subscribed channels to a user. Also, other types of channels such as tiers of channels and computer network channels can also be advertised as shown by the promotion examples 133. Additionally, sole individual programs on one premium channel can be advertised along with subscriptions to other premium channels (e.g. SHO+Soprano's only on HBO). Further, it should be appreciated that the promotion display 119 need not only advertise bundled premium channels (e.g. HBO and SHO), but can also advertise other types of channels (e.g. expanded basic service, individual channels, etc.), computer network channels, individual subscription programs, Internet channels, Internet access, data channels (e.g. sports, news, etc.), Enhanced TV, Interactive TV, and a variety of other services provided by video distribution systems.

For example, promotion examples 133 provides some illustrative examples of bundled channels (as well as individual channels) that can be promoted such as: HBO+Sports tier $25/month, Drama tier+Sports tier $25/month, Internet service provider (ISP) service $35/month, ENC $25/month, HBO+SHO+ISP $40/month, HBO+Sports tier+ISP $40/month, SHO+SOPRANOS $20/month. In particular, all of these additional premium channels, Internet service, tiers of channels, individual subscription programs can be recommend to the user by the preference engine 113 based upon a user's viewing profile 160 (e.g. what types of story-lines they prefer in movies and programs, whether they currently have Internet access, what sort of content they enjoy (action, sports, drama, etc.)) to thereby present a targeted promotion field 119 advertising bundle of channels to the user. Moreover, by allowing users to subscribe to a bundle of different channels or services from different providers (e.g. HBO from a cable provider, a Sports tier from a satellite provider, and ISP service from EARTHLINK) this allows for partnering among these various providers as well as increased customer satisfaction and lower customer churn (or attrition).

The video distribution system interface 110 receives the promotion information and the display interface displays a promotion display 119 for a bundle of channels on the display device 104. The terminal controller 115 responsive to the subscription control program 116, and in response to user input 114 (i.e. a user selecting the promotion display 119), selects the promotion display 119. The terminal controller 115 responsive to the subscription control program 116 then causes a subscription request to be transmitted for the selected bundle of channels of the promotion display 119 (e.g. HBO+SHO shown in FIG. 1) to be transmitted to the video distribution system 102. Thus, a user can simply select a promotion display 119, via user input 114, and subscribe to a bundle of channels.

Moreover, as previously discussed, the preference engine 113 can select a promotion display 119 for a bundle of channels for display on the display device 104 based upon a user's viewing patterns to thereby provide targeted promotions to the user. For example, if the user's viewing profile 160 indicates that the user likes sports and mob movies, the preference engine 113 may cause the promotion display 119 to advertise HBO, which has the program the Soprano's that has a mob based storyline, and the Sports tier. Thus, the promotion display 119 by advertising targeted bundles of channels to the user, may cause the user to make impulse subscriptions to bundles of channels they may not otherwise subscribe to, thereby providing increased revenues to video distribution systems.

Figure 4:
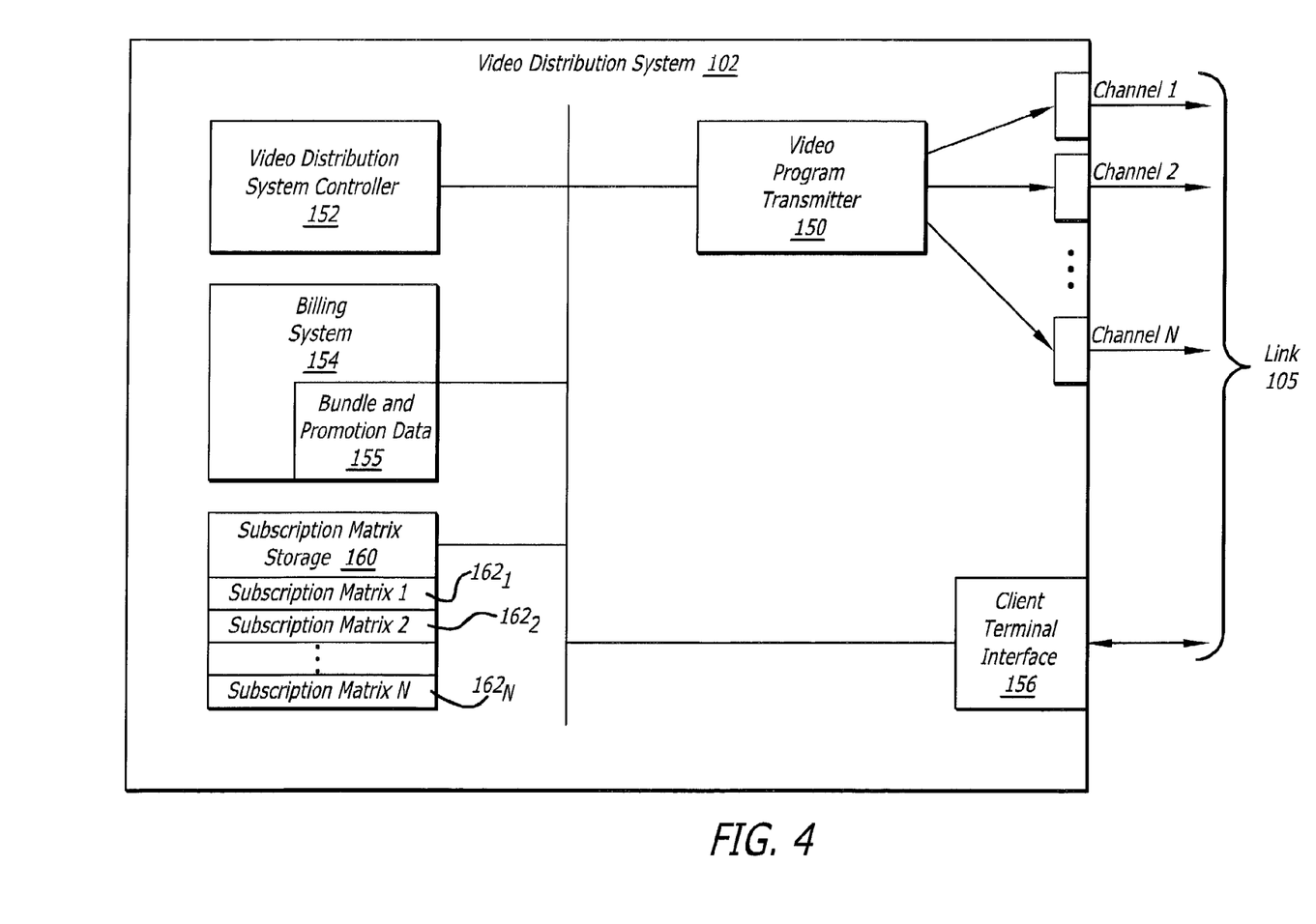
FIG. 4 shows a more specific embodiment of the video distribution system of FIG. 1.

Referring also to FIG. 4, FIG. 4 shows a more specific embodiment of the video distribution system 102 of FIG. 1. The video distribution system 102 includes a video program transmitter 150, a video distribution system controller 152, a billing system 154, a client terminal interface 156, and a subscription matrix storage 160. Under the control of the video distribution system controller 152, the video program transmitter 150 transmits video programs and program guide information on channels$_{1-N}$ via link 105 to client terminals. Furthermore, the video distribution system controller 152 interacts with the billing system 154 and the subscription matrix storage 160. The billing system 154 manages the billing of subscribers to the video distribution system 102. Also, the billing system 154 includes bundle and promotion data 155 that includes the currently available bundles of channels (e.g. premium channels), and their associated prices, as well as, promotional data. The bundle and promotion information is transmitted to client terminals 100, for use by the client terminals, in bundling channels, offering bundled channels, and in advertising bundled channels via the promotion display 119. The bundle and promotion data can instead be located, or co-located, at the client terminal or at other remote locations, such as at a back office.

The subscription matrix storage 160 stores a subscription matrix 122, as previously discussed, for each subscribed client terminal, shown as subscription matrix$_{1-N}$ 122$_{1-N}$, respectively. It should be appreciated that the billing system 154 and the subscription matrix storage 160 do not have to be located at the video distribution system 102, and can be located or co-located elsewhere such as at a back office.

After the video distribution system 102 receives the subscription request for the selected bundle of channels from the client terminal 100 via the client terminal interface 156 (e.g. due to a selection of a bundle channels from the program guide 106 or the promotion display 119), the video distribution system 102 verifies a user's credit with the billing system 154 to determine whether the user's credit is approved or disapproved for the selected bundle of channels. In verifying the user's credit, the video distribution system 102 checks the user's account status to make sure that user is current on their bills (i.e. not delinquent) and to verify that the user's request is in accord with any restrictions placed by the user on their account (e.g. not to exceed a certain amount or not to order adult channels, etc.). If the user's credit is not approved, the video distribution system 102 via the client interface 156 transmits the disapproval to the client terminal 100 thereby denying the request. However, if the user's credit is approved, then the subscription matrix 122$_{1-N}$ for the associated client terminal is updated to reflect that the client terminal is now subscribed to the selected bundle of channels and the approval for the selected channel is sent to the client terminal 100 via client interface 156 and link 105. Particularly, the subscription matrix 122 is updated such that subscribed channels data 174 includes each newly subscribed to channel of the selected bundle of channels and the bundle data 175 is updated to reflect the newly subscribed bundle of channels. The billing system 154 will then bill the subscriber for the newly subscribed bundle of channels by whatever method the billing system and/or subscriber utilize or have agreed upon.

At the client terminal 100, the terminal controller 115 responsive to the subscription control program 116 receives the approval or disapproval from the video distribution system 102. If the user's credit has been disapproved, the terminal controller 115 responsive to the subscription control program 116 denies the request for the subscription to the selected channel and informs the user. However, if the user's credit has been approved, then the terminal controller 115 responsive to the subscription control program 116 updates the subscription matrix 122 in local memory 120 to reflect that the client terminal 100 is now subscribed to the selected bundle of channels and authorizes access to the selected bundle of channels. Particularly, the subscription matrix 122 is updated such that subscribed channels data 174 includes each newly subscribed to channel of the selected bundle of channels and the bundle data 175 is updated to reflect the newly subscribed to bundle of channels. In this way, the subscription matrix 122$_{1-N}$ for the client terminal 100 at the video distribution center 102 is consistent with the local subscription matrix 122 at the client terminal 100. Authorizing access to the selected bundle of channels generally includes de-scrambling each channel of the bundle of channels such that each channel can be viewed on the display device 104.

The program guide entry 107 for each channel of the selected bundle of channels will now be designated to indicate that it is now a subscribed channel. For example, the program guide entry 107 for each channel of the bundle of channels can be designated by highlighting to indicate that it is now a subscribed channel. As an example, if the user picked the non-subscribed premium channel 52 HBO 109 and then selected bundle 1 for subscription, premium channel 52 HBO would now become a subscribed channel and would be highlighted. Thus, utilizing embodiments of the invention, a user who initially selects a channel for subscription, can be offered a discounted bundle of channels as well as other bundles, and can easily subscribe to a bundle of channels from the program guide 106 on his or her display device 104, simply utilizing the client terminal 100, without having to go through the laborious process of having to call into the video distribution system 102.

Also, according to other embodiments of the invention, it should be appreciated that the video distribution system controller 152 of the video distribution system 102 can perform many of the functions performed by the client terminal 100, instead of the client terminal 100, to provide for subscription to a bundle of channels from the program guide 106. In one embodiment, the subscription control program 116 can be located at the video distribution system 102 and can be implemented by the video distribution system controller 152 or another computing device or processor.

For example, in response to user input 114 selecting a program guide entry 107 for a channel or a promotion display 119, the video distribution system controller 152 can determine whether the user has an existing subscription (i.e. whether it is a subscribed channel) by examining the client terminal's associated subscription matrix 122$_{1-N}$ at the video distribution system 102. Furthermore, the video distribution system controller 152 can select at least one bundle of channels based upon the subscription matrix 122 for the user, the selected program guide entry, and the available bundles of channels for subscription. The available bundles of channels for subscription can be determined by examining the bundle and promotion data 155 at the video distribution system 102. Based upon this, video distribution system controller 152 recommends at least one bundle of channels to the user for subscription. For example, the video distribution system controller 152 can recommend the most cost effective bundle of channels, as well as, other bundles of channels providing a greater array of premium channels.

The video distribution system controller 152 can then further cause the client terminal 100 to display the recommended bundle(s) of channel (e.g. a numbered list of bundles selectable by the user) on the display device 104. In response to user input 114 from client terminal 100 selecting one of the bundle of channels, the video distribution system controller 152 can then verify the user's credit with the billing system 154 to determine whether the user's credit is approved or disapproved, as previously discussed. If the user's credit is approved, the video distribution system controller 152 can update the subscription matrix $122_{1-N}$ for the associated client terminal 100 to reflect the client terminal is now subscribed to the selected bundle of channels. In turn, the video distribution system controller 152 can command that the client terminal 100 update the subscription matrix 122 stored in local memory 120 and authorize access to the selected bundle of channels. Thus, the video distribution system 102 can perform many of the functions performed by the client terminal 100.

Figure 5:
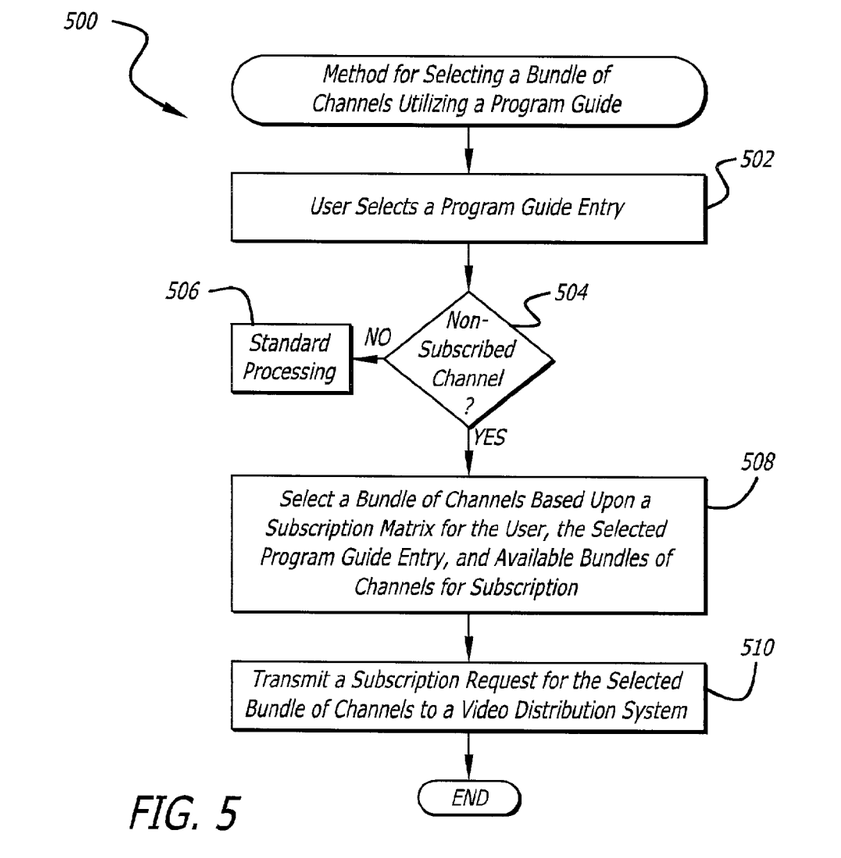
FIG. 5 is a flow diagram according to an embodiment of the invention.

FIG. 5 is a flow diagram 500 according to an embodiment of the invention. The flow diagram 500 illustrates an embodiment of a method for selecting a bundle of channels utilizing a program guide 106. At step 502, a user selects a program guide entry 107. At step 504, the terminal controller 115 responsive to the subscription control program 116 determines whether the user has an existing subscription for the selected program guide entry (i.e. whether is a subscribed or a non-subscribed channel). In one embodiment, this can be accomplished by examining a subscription matrix. If the user has an existing subscription (i.e. the channel is a subscribed channel), then the client terminal 100 performs standard processing at step 506 such that the channel is selected and displayed on the display device 104. However, if the user does not have an existing subscription (i.e. it is a non-subscribed channel), then at step 508, the terminal controller 115 responsive to the subscription control program 116 selects a bundle of channels based upon the subscription matrix for the user, the selected program guide entry, and the available bundles of channels for subscription. Next, at step 510, the terminal controller 115 responsive to the subscription control program 116 transmits a subscription request for the selected bundle of channels to the video distribution system 102.

Figure 6:
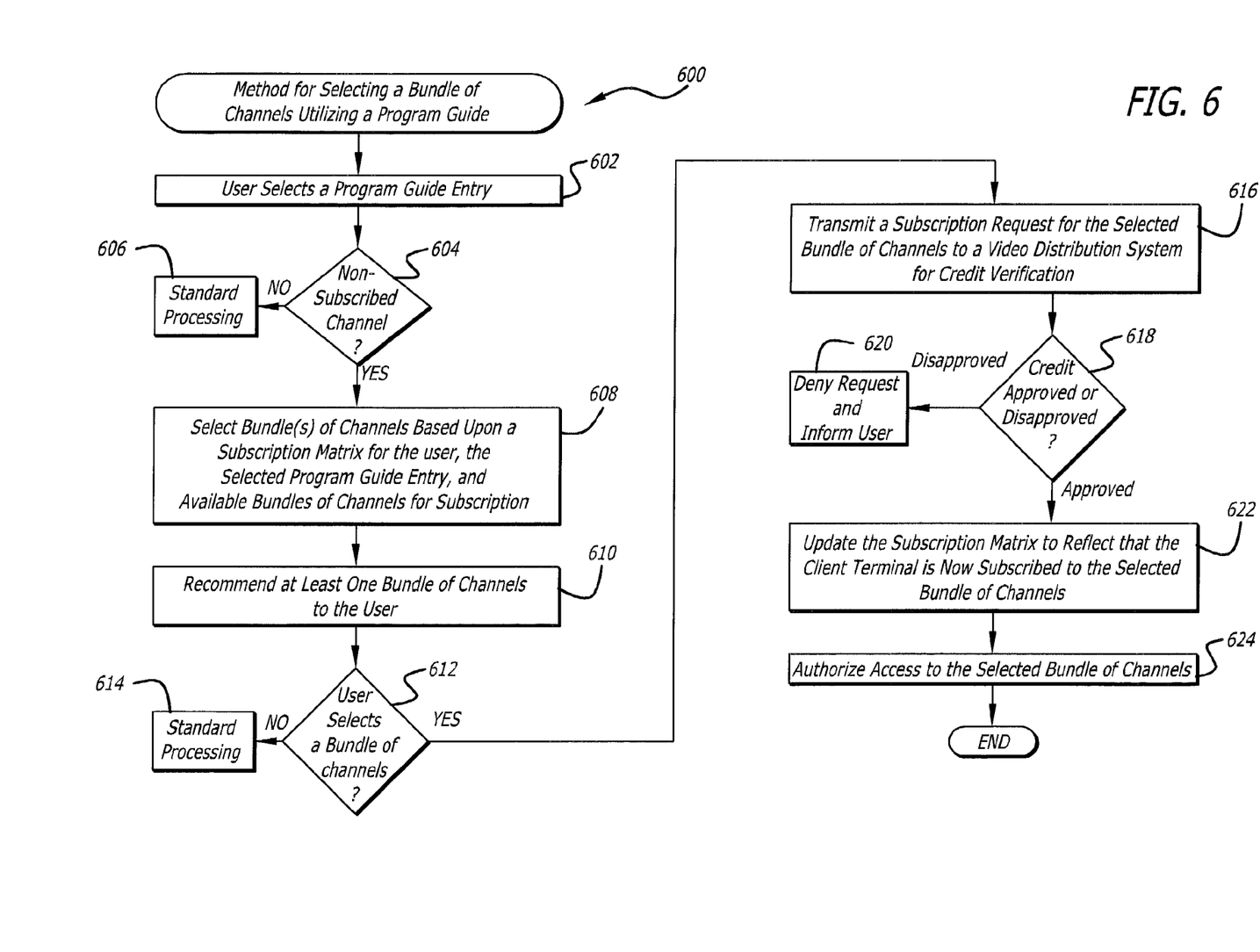
FIG. 6 is a more detailed flow diagram according to an embodiment of the invention.

FIG. 6 is a more detailed flow diagram 600 according to an embodiment of the invention. The flow diagram 600 illustrates another embodiment of a method for selecting a bundle of channels utilizing a program guide 106. At step 602, a user selects a program guide entry 107. At step 604, the terminal controller 115 responsive to the subscription control program 116 determines whether the user has an existing subscription for the selected program guide entry (i.e. whether is a subscribed or a non-subscribed channel). In one embodiment, this can be accomplished by examining a subscription matrix. If the user has an existing subscription (i.e. the channel is a subscribed channel), then the client terminal 100 performs standard processing at step 606 such that the channel is selected and displayed on the display device 104.

However, if the user does not have an existing subscription (i.e. it is a non-subscribed channel), then at step 608, the terminal controller 115 responsive to the subscription control program 116 selects at least one bundle of channels based upon the subscription matrix for the user, the selected program guide entry, and the available bundles of channels for subscription. Next, at step 610, the terminal controller 115 recommends at least one bundle of channels to the user. In one embodiment, terminal controller 115 recommends the most cost effective bundle of channels, as previously discussed. At step 612, the terminal controller 115 responsive to the subscription control program queries the user as to whether the user would like to select a bundle of channels. If the user does not select a bundle of channels, at step 614, standard processing is performed such that the user is returned to the program guide 106 and can again select a program guide entry 107 from the program guide 106.

On the other hand, if the user selects a bundle of channels, then at step 616, the terminal controller 115 responsive to the subscription control program 116 transmits a subscription request for the selected bundle of channels to the video distribution system 102 for credit verification. At step 618, the user's credit is verified. If the user's credit is disapproved, then at step 620, the user's request is denied and the user is informed. However, if the user's credit is approved, at step 622 a user subscription matrix is updated to reflect the fact that the user is now subscribed to the selected bundle of channels. At step 624, access to each channel of the bundle of channels is authorized. Thus, the user can now view each channel of the newly subscribed to bundle of channels.

The embodiments of the present invention and their various functional components can be implemented in hardware, software, firmware, middleware or a combination thereof and utilized in systems, subsystems, components, or sub-components thereof. When implemented in software, these embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

We claim:

1. A client terminal connectable to a video distribution system and a display device, the video distribution system provides program guide information to create a program guide that includes program guide entries for subscribed channels and non-subscribed channels, the client terminal comprising:
    a video distribution system interface to receive the program guide information;
    a display interface to display the program guide on the display device;
    a user interface to receive user input; and
    a terminal controller responsive to a subscription control program for:
        a. in response to user input, selecting a program guide entry from the program guide; and
        b. upon selection of a program guide entry that is for a non-subscribed channel,
            i. recommending at least one bundle of channels for subscription by the user based upon a subscription matrix for the user that is stored locally at the client terminal, the currently selected program guide entry for the non-subscribed channel displayed in the program guide, and available bundles of channels for subscription, wherein the subscription matrix includes channels subscribed to by the client terminal and available channels not subscribed to by the client terminal;

ii. accepting user input to select a bundle of channels for subscription by the user; and iii. transmitting a subscription request for the selected bundle of channels to the video distribution system.

2. The client terminal of claim 1, wherein, the video distribution system after receipt of the subscription request for the selected bundle of channels verifies a user's credit with a billing system to determine whether the user's credit is approved or disapproved for the selected bundle of channels, the terminal controller responsive to the subscription control program for:

a. receiving the approval or disapproval from the video distribution system; and b. if the user's credit is approved, i. updating the subscription matrix to reflect that the client terminal is now subscribed to the selected bundle of channels; and ii. authorizing access to the selected bundle of channels.

3. The client terminal of claim 1, wherein, the selected bundle of channels is the most cost effective bundle of channels having a subscription cost that is less than the subscription cost of individually subscribing to the non-subscribed channel.

4. The client terminal of claim 1, further comprising a preference engine, wherein the preference engine selects program guide entries for non-subscribed channels for display in the program guide based upon a user's viewing patterns.

5. The client terminal of claim 1, wherein, the client terminal is coupled to the video distribution system by a link that provides a persistent connection.

6. The client terminal of claim 1, wherein, a channel includes a tier of channels.

7. The client terminal of claim 1, wherein, a channel includes a computer network channel.

8. The client terminal of claim 1, further comprising, selecting only a program of the program guide entry of a non-subscribed channel for subscription in selecting the bundle of channels.

9. The client terminal of claim 1, wherein, the video distribution system is a cable head end.

10. A computer program embodied in a computer readable storage medium for use in a client terminal connectable to a video distribution system and a display device, the video distribution system provides program guide information to create a program guide that includes program guide entries for subscribed channels and non-subscribed channels, the computer program comprising code segments for:

a. in response to user input, selecting a program guide entry from the program guide; and b. upon selection of a program guide entry that is for a non-subscribed channel, i. recommending at least one bundle of channels for subscription by the user based upon a subscription matrix for the user that is stored locally at the client terminal, the currently selected program guide entry for the non-subscribed channel displayed in the program guide, and available bundles of channels for subscription, wherein the subscription matrix includes channels subscribed to by the client terminal and available channels not subscribed to by the client terminal;

ii. accepting user input to select a bundle of channels for subscription by the user; and iii. transmitting a subscription request for the selected bundle of channels to the video distribution system.

11. The computer program of claim 10, wherein, the video distribution system after receipt of the subscription request for the selected bundle of channels verifies a user's credit with a billing system to determine whether the user's credit is approved or disapproved for the selected bundle of channels, further comprising code segments for:

a. receiving the approval or disapproval from the video distribution system; and b. if the user's credit is approved, i. updating the subscription matrix to reflect that the client terminal is now subscribed to the selected bundle of channels; and ii. authorizing access to the selected bundle of channels.

12. The computer program of claim 10, wherein, the selected bundle of channels is the most cost effective bundle of channels having a subscription cost that is less than the subscription cost of individually subscribing to the non-subscribed channel.

13. The computer program of claim 10, further comprising code segments for:

a. displaying a promotion display for a bundle of channels b. in response to user input, selecting the promotion display; and c. transmitting a subscription request for the bundle of channels to the video distribution system.

14. The computer program of claim 10, further comprising code segments for selecting program guide entries for non-subscribed channels for display in the program guide based upon a user's viewing patterns.

15. The computer program of claim 10, wherein, the client terminal is coupled to the video distribution system by a link that provides a persistent connection.

16. The computer program of claim 10, wherein, a channel includes a tier of channels.

17. The computer program of claim 10, wherein, a channel includes a computer network channel.

18. The computer program of claim 10, further comprising code segments for selecting only a program of the program guide entry on a non-subscribed channel for subscription in selecting the bundle of channels.

19. The computer program of claim 10, wherein, the video distribution system is a cable head end.

20. A method for selecting a bundle of channels utilizing a program guide, the program guide including program guide entries for subscribed channels and non-subscribed channels, the method comprising the steps of:

a. in response to user input received at a client terminal, selecting a program guide entry from the program guide;

b. upon selection of a program guide entry that is for a non-subscribed channel, 1. performing processing at the client terminal to recommend at least one bundle of channels for subscription by the user based upon a subscription matrix for the user that is stored locally at the client terminal, the currently selected program guide entry for the non-subscribed channel displayed in the program guide, and available bundles of channels for subscription, wherein the subscription matrix includes channels subscribed to by the client terminal and available channels not subscribed to by the client terminal;

2. accepting user input to select a bundle of channels for subscription by the user; and 3. transmitting a subscription request for the selected bundle of channels from the client terminal to a video distribution system.

21. The method of claim 20, wherein, the video distribution system after receipt of the subscription request for the selected bundle of channels verifies a user's credit with a billing system to determine whether the user's credit is approved or disapproved for the selected bundle of channels, further comprising steps for:

a. receiving the approval or disapproval from the video distribution system; and b. if the user's credit is approved, i. updating the subscription matrix to reflect that the client terminal is now subscribed to the selected bundle of channels; and ii. authorizing access to the selected bundle of channels.

22. The method of claim 20, wherein, the selected bundle of channels is the most cost effective bundle of channels having a subscription cost that is less than the subscription cost of individually subscribing to the non-subscribed channel.

23. The method of claim 20, further comprising steps for:

a. displaying a promotion for a bundle of channels b. in response to user input, selecting the promotion display; and c. transmitting a subscription request for the bundle of channels to the video distribution system.

24. The method of claim 20, further comprising the step of selecting program guide entries for non-subscribed channels for display in the program guide based upon a user's viewing patterns.

25. The method of claim 20, wherein, the client terminal is coupled to the video distribution system by a link that provides a persistent connection.

26. The method of claim 20, wherein, a channel includes a tier of channels.

27. The method of claim 20, wherein, a channel includes a computer network channel.

28. The method of claim 20, further comprising the step of selecting only a program of the program guide entry on a non-subscribed channel for subscription in selecting the bundle of channels.

29. The method of claim 20, wherein, the video distribution system is a cable head end.

* * * * *